(No Model.)

J. STANLEY.
HORSESHOE PAD.

No. 597,549. Patented Jan. 18, 1898.

WITNESSES:
A. R. Krousse
C. B. Pilney

James Stanley, INVENTOR

BY Drake & Co.

ATTORNEYS.

UNITED STATES PATENT OFFICE.

JAMES STANLEY, OF NEWARK, NEW JERSEY.

HORSESHOE-PAD.

SPECIFICATION forming part of Letters Patent No. 597,549, dated January 18, 1898.

Application filed June 24, 1896. Serial No. 596,675. (No model.)

*To all whom it may concern:*

Be it known that I, JAMES STANLEY, a citizen of the United States, residing at Newark, in the county of Essex and State of New Jersey, have invented certain new and useful Improvements in Horseshoes; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The objects of this invention are to provide pads for the hoofs of horses which will maintain proper relations to the heel or frog under all circumstances and conditions and will not sag or drop from a normal position when wet, to avoid cementing operations and the lack of durability and strength incident thereto, and to secure other advantages and results, some of which may be referred to hereinafter in connection with the description of the working parts.

The invention consists in the improved hoof-pad and in the arrangements and combinations of parts thereof, all substantially as will be hereinafter set forth, and finally embraced in the clauses of the claim.

Figure 1:
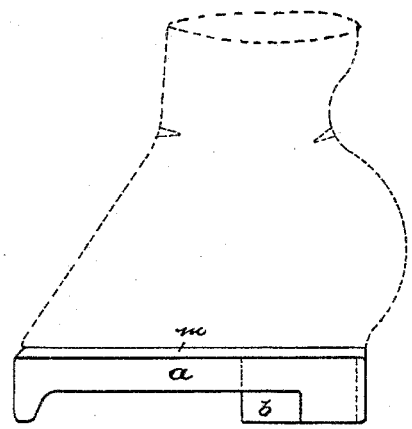
Figure 3:
Figure 2:
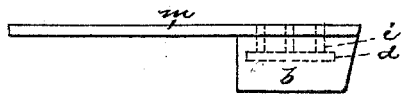

Referring to the accompanying drawings, in which like letters of reference indicate corresponding parts in each of the several views, Figure 1 is a side elevation of the pad, showing its relation to the hoof and shoe and showing the preferred construction. Fig. 2 is a side elevation of the same detached from the hoof and shoe. Fig. 3 is a detail of a certain core-plate with integral rivets, and Fig. 4 is a section showing said plate in its relation to the heel-pad and hoof-plate.

In said drawings, $a$ indicates the horse's shoe, which may be of any desired construction.

$b$ indicates an elastic pad-body adapted to lie beneath the horse's frog or heel, and $d$ indicates a core-plate over which the said elastic pad-body $b$ is molded. The pad-body $b$ is fastened to hoof-plates $m$ by rivets $i$. Said hoof-plates are of leather and conform more or less closely to the plan of the hoof, being adapted to extend between the hoof and shoe and be fastened in place when the shoe is fitted upon the foot.

Figure 4:
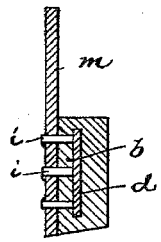

I may cast or mold into the rubber pad core-plates, such as shown in Figs. 3 and 4, the rivets $i$ in this case being cast integrally upon the said core-plate in the form of pointed pintles. By forcing the projecting ends of said pintles through the leather hoof-plates and turning or upsetting the ends, as shown in Fig. 6, the leather hoof-plate and rubber pad are held together with firmness and security and the objections to cement are avoided.

Having thus described the invention, what I claim as new, is—

1. The combination with the leather hoof-plate, of an elastic pad, a core-plate inclosed in said pad, and metallic fasteners joining said core-plate and leather hoof-plate, substantially as set forth.

2. The combination with the hoof-plate, of an elastic pad, a core-plate, and rivets joining said core-plate and hoof-plate, substantially as set forth.

In testimony that I claim the foregoing I have hereunto set my hand this 25th day of May, 1896.

JAMES STANLEY.

Witnesses:
CHARLES H. PELL,
C. B. PITNEY.